US007757680B2

(12) United States Patent
Park

(10) Patent No.: US 7,757,680 B2
(45) Date of Patent: Jul. 20, 2010

(54) CLOSED CRANKCASE VENTILATION APPARATUS

(75) Inventor: Sanghoon Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 304 days.

(21) Appl. No.: 12/039,094

(22) Filed: Feb. 28, 2008

(65) Prior Publication Data

US 2009/0139503 A1 Jun. 4, 2009

(30) Foreign Application Priority Data

Nov. 29, 2007 (KR) ..................... 10-2007-0122814

(51) Int. Cl.
*F02M 25/06* (2006.01)

(52) U.S. Cl. ...................................... 123/572; 123/574

(58) Field of Classification Search ......... 123/572–574, 123/41.86
See application file for complete search history.

(56) References Cited

U.S. PATENT DOCUMENTS 4,169,432 A * 10/1979 White ..................... 123/41.86
5,564,401 A * 10/1996 Dickson ..................... 123/573
2002/0088445 A1 * 7/2002 Weindorf et al. ............ 123/572
2004/0035403 A1 * 2/2004 Pateman et al. ............. 123/574
2009/0050121 A1 * 2/2009 Holzmann et al. .......... 123/573
2009/0183717 A1 * 7/2009 Gillenberg et al. .......... 123/573

* cited by examiner

*Primary Examiner*—M. McMahon
(74) *Attorney, Agent, or Firm*—Morgan, Lewis & Bockius LLP

(57) ABSTRACT

A CCV apparatus that exhausts blow-by gas from a crankcase effectively and thereby prevents pressure in a crankcase from excessively increasing may include: a lower case, a middle case comprising a body, an upper plate and a cup wherein the upper plate is provided with a blow-by gas passageway coupled with a filter in the cup for flowing blow-by gas into the body therethrough and at least a gas hole formed in the upper plate outside the cup for flowing the filtered blow-by gas in the body to the exterior of the cup, and an upper case enclosing an opening at an upper end of the cup. The apparatus further comprises a by-pass passageway selectively detouring the blow-by gas from the inlet pipe according to a pressure of the blow-by gas in the inlet pipe wherein the by-pass passageway is mounted at the exterior of the cases.

8 Claims, 9 Drawing Sheets

CLOSED CRANKCASE VENTILATION APPARATUS

CROSS-REFERENCE TO RELATED APPLICATION

This application claims priority to and the benefit of Korean Patent Application No. 10-2007-0122814 filed in the Korean Intellectual Property Office on Nov. 29, 2007, the entire contents of which are incorporated herein by reference.

BACKGROUND OF THE INVENTION (a) Field of the Invention

The present invention relates to a closed crankcase ventilation apparatus, and more particularly, to a closed crankcase ventilation apparatus that exhausts blow-by gas from a crankcase effectively and thereby prevents pressure in a crankcase from excessively increasing.

(b) Description of the Related Art

Blow-by gas is gas leaked from a combustion chamber of an engine to a crankcase, and such blow-by gas is generated mostly in a compression stroke and partly in an expansion stroke.

Since the blow-by gas is a main cause of air pollution, the blow-by gas is forcibly supplied to an intake manifold by a closed crankcase ventilation (CCV) apparatus and is re-burned.

Referring to FIG. 6 to FIG. 8, a conventional CCV apparatus will be described.

As shown in FIG. 6, according to a conventional CCV apparatus, a middle case 23 is coupled to a lower case 13, and an upper case 20 is coupled to an upper portion of the middle case 23.

The lower case 13 has a cylindrical shape, a lower end of the lower case 13 is connected to a withdrawal pipe 15, and the withdrawal pipe 15 is connected to an oil pan (not shown).

The middle case 23 includes a body 32 mounted in the lower case 13, an upper plate 29 coupled to an upper end of the body 32, and a cup 27 formed on an upper surface of the upper plate 29.

A blow-by gas passageway 25 penetrates a middle portion of the upper plate 29, and a filter 30 is mounted at a lower portion of the blow-by gas passageway 25. The filter 30 filters engine oil contained in the delivered blow-by gas, and the filtered engine oil is withdrawn to the oil pan (not shown) disposed at a lower portion of an engine through the withdrawal pipe 15.

The upper plate 29 blocks flow of blow-by gas between the cup 27 and the body 32 except flow of blow-by gas through the blow-by gas passageway 25. In addition, a gas hole 70 is formed at the upper plate 29 and outside the cup 27, and the gas hole 70 exhausts to the exterior of the cup 27 the blow-by gas that is filtered by the filter 30 and stored in the body 32.

A first elastic member 35 is mounted at an exterior circumference of an upper portion of the blow-by gas passageway 25.

The cup 27 is formed on the upper surface of the upper plate 29, and an inlet pipe 5 for receiving blow-by gas from the crankcase and an outlet pipe 10 for supplying filtered or detoured blow-by gas to the intake manifold are formed at a side external surface of the cup 27. The inlet pipe 5 and the outlet pipe 10 are coupled to the upper end of the lower case 13. The inlet pipe 5 is fluidly-communicated with the inside of the cup 27 such that blow-by gas in the crankcase flows into the cup 27. The outlet pipe 10 is fluidly-communicated with the inside of the cup 27 through the gas hole 70. Therefore, blow-by gas in the cup 27 does not directly flow to the outlet pipe 10. Instead, blow-by gas in the cup 27 flows to the outlet pipe 10 through the gas hole 70 after being filtered.

In addition, the cup 27 is provided with a diaphragm 40 for covering an opening formed at an upper end of the cup 27. The diaphragm 40 is disposed apart from an upper portion of the blow-by gas passageway 25 by the first elastic member 35.

The upper case 20 is configured to enclose the upper end of the cup 27. The upper case 20 has a hollow such that the diaphragm 40 moves upwardly or downwardly therein, and a second elastic member 50 is interposed between the upper case 20 and the diaphragm 40.

As shown in FIG. 7, a by-pass hole 60 is formed at the upper end of the cup 27. When the diaphragm 40 covers the opening at the upper end of the cup 27, the by-pass hole 60 is blocked and blow-by gas in the cup 27 is not detoured to the outlet pipe 10. However, when the blow-by gas received from the inlet pipe 5 is sufficiently enough to detach the diaphragm 40 from the upper end of the cup 27 by overcoming the second elastic member 50, the by-pass hole 60 is opened and blow-by gas in the cup 27 flows to the outlet pipe 10 through the by-pass hole 60 as shown in FIG. 9. The by-pass hole 60 prevents pressure in the crankcase from excessively increasing.

In addition, an indicator 55 is mounted on a portion of an upper end of the diaphragm 40. The indicator 55, together with the diaphragm 40, moves upwardly or downwardly and displays degradation of the filter 30.

As shown in FIG. 8, in a case in which pressure in the crankcase is not high, the diaphragm 40 blocks the by-pass hole 60 and blow-by gas is exhausted to the outlet pipe 10 through the gas hole 70 after being filtered by the filter 30.

As shown in FIG. 9, in a case in which pressure in the crankcase is high, the diaphragm 40 moves upwardly by pressure of the blow-by gas and opens the by-pass hole 60. Therefore, a part of blow-by gas in the cup 27 is directly exhausted to the outlet pipe 10 through the by-pass hole 60.

According to the conventional CCV apparatus, since the first elastic member 35 for controlling pressure in the crankcase and the second elastic member 50 for controlling the by-pass operation apply elastic force together to the diaphragm 40, tuning of the first and second elastic members 35 and 50 for preferable operation of the diaphragm 40 may be difficult due to the nonlinearity of the first and second elastic members 35 and 50. In addition, when blow-by gas is detoured, the rubber material of the diaphragm may move quickly and be damaged.

As shown in FIG. 7, since the by-pass hole 60 is formed at the upper end of the cup 27, it is difficult for the area of the by-pass hole 60 to be enlarged. Therefore, the cross-sectional area of the by-pass hole 60 is smaller than that of the blow-by gas passageway 25 and thus a small amount of blow-by gas may be detoured. Therefore, pressure in the crankcase is reduced slowly as shown in FIG. 5. In addition, since the diaphragm of a rubber material operates as a valve, air-tightness may deteriorate.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a CCV apparatus having advantages of increasing bypass amount of blow-by gas and preventing pressure in a crankcase from excessively increasing.

A CCV apparatus according to an exemplary embodiment of the present invention may include: a lower case connected to a withdrawal pipe; a middle case comprising a body mounted in the lower case, an upper plate coupled with an upper end of the body, and a cup formed on an upper surface of the upper plate, the upper plate being provided with a blow-by gas passageway in the cup for flowing blow-by gas into the body therethrough and at least a gas hole formed in the upper plate outside the cup for flowing the blow-by gas in the body to the exterior of the cup; a filter mounted at a lower portion of the blow-by gas passageway and filtering engine oil contained in the blow-by gas wherein the filtered engine oil is withdrawn through the withdrawal pipe; an inlet pipe connected to a portion of an exterior circumference of the cup in order to flow the blow-by gas of the inlet pipe into the cup; an outlet pipe fluidly communicating with the gas hole of the middle case in order to exhaust the filtered blow-by gas in the body; an upper case having an one-side opened structure and configured to enclose an opening at an upper end of the cup; and a by-pass passageway selectively detouring the blow-by gas of the inlet pipe according to a pressure of the blow-by gas in the inlet pipe wherein the by-pass passageway is mounted at the exterior of the lower, middle and upper cases, and wherein the blow-by gas in the inlet pipe flows through the blow-by gas passageway in low pressure and the blow-by gas in the inlet pipe flows through the blow-by gas passageway and the by-pass passageway in high pressure The CCV apparatus may further include a diaphragm for covering the opening of the cup in the upper case, wherein the diaphragm is disposed apart from an upper portion of the blow-by gas passageway by a predetermined distance.

The CCV apparatus may further include a first elastic member mounted at an exterior circumference of the upper portion of the blow-by gas passageway, wherein the first elastic member has the predetermined distance and a distal end of the first elastic member is coupled to the diaphragm, elastically supporting the diaphragm.

The by-pass passageway of the CCV apparatus may comprise: a by-pass inlet pipe bifurcated from the inlet pipe; a connecting pipe connected to the by-pass inlet pipe and formed in a longitudinal axis of the upper case, a lower end thereof being blocked by the upper case and an upper end thereof being opened; a by-pass outlet pipe; and a by-pass valve selectively connecting the connecting pipe with the by-pass outlet pipe, wherein the by-pass valve is disposed in a guide passageway coaxially formed with the connecting pipe thereabove and the guide passageway guides a motion of the by-pass valve.

In an embodiment of the by-pass passageway of the CCV apparatus, the by-pass outlet pipe is always connected to the outlet pipe.

The CCV apparatus may further a second elastic member mounted in the guide passageway and positioned above the by-pass valve, and applying elastic force to the by-pass valve.

The CCV apparatus may further an indicator mounted on an upper end of the by-pass valve and displaying degradation of the filter through an opening of the guide passageway.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
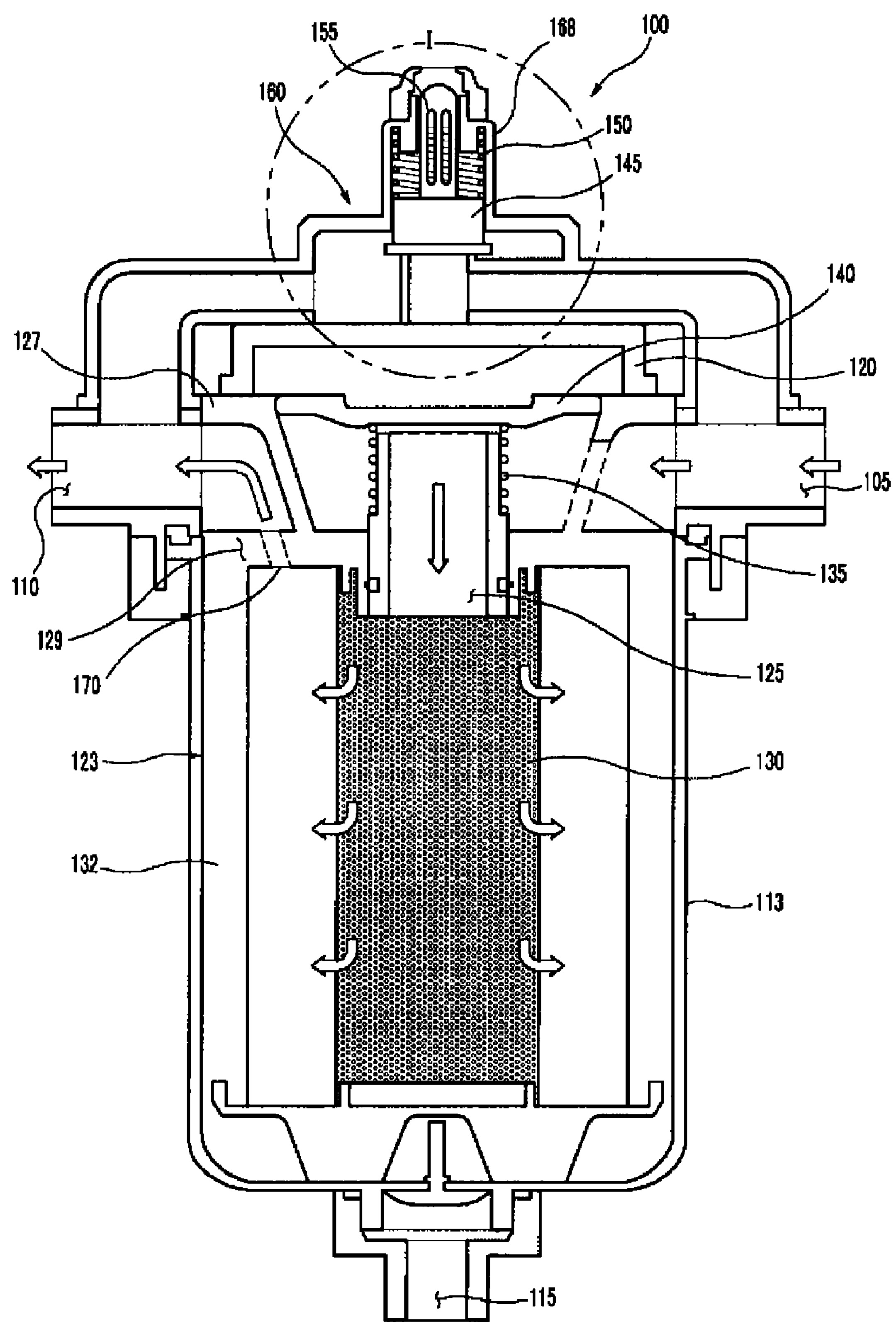
FIG. 1 is a cross-sectional view of a CCV apparatus in a state of not detouring blow-by gas according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
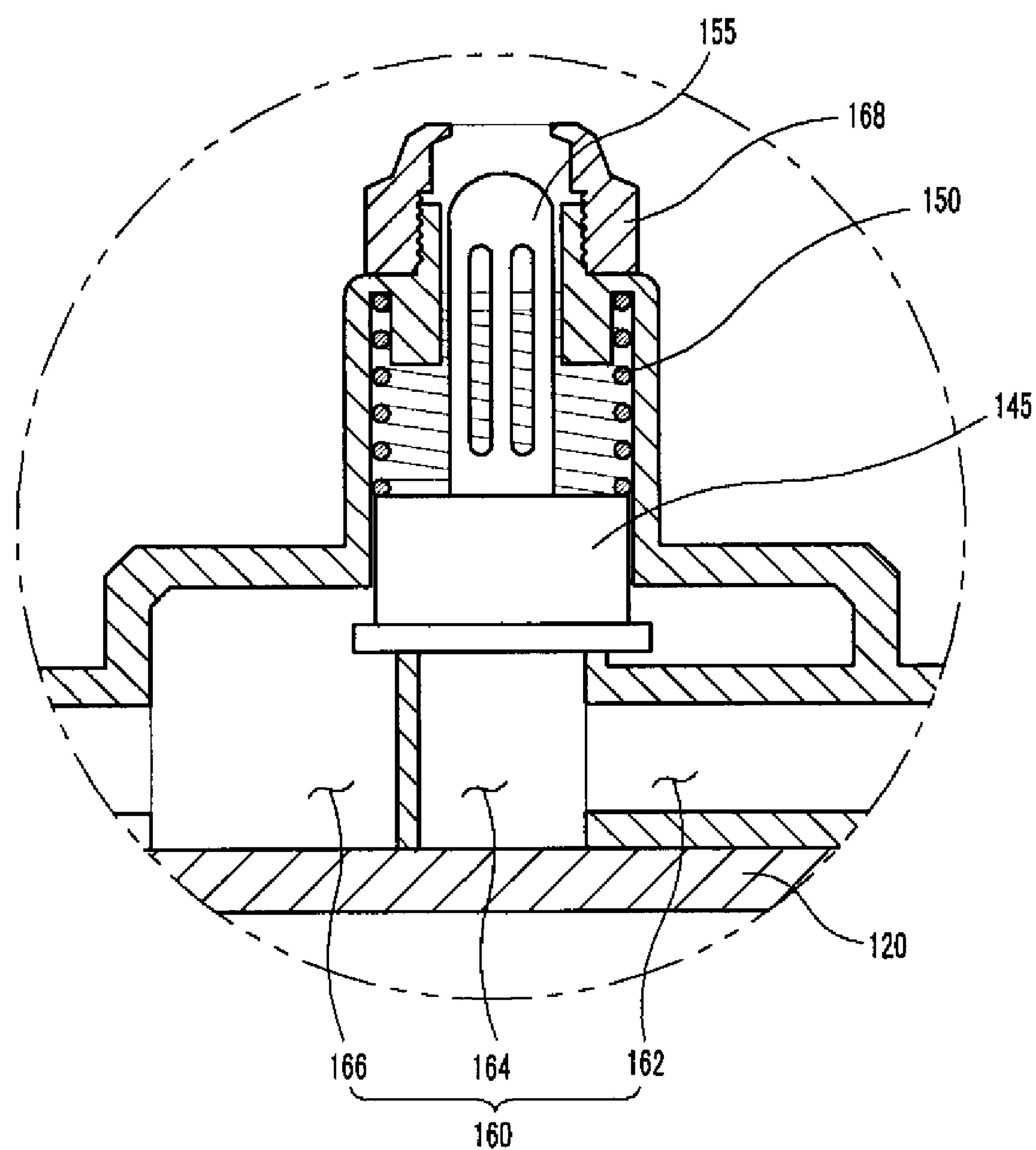
FIG. 2 is an enlarged view of an "I" portion of FIG. 1.

FIG. 1 is a cross-sectional view of a CCV apparatus in a state of not detouring blow-by gas according to an exemplary embodiment of the present invention, and FIG. 2 is an enlarged view of an "I" portion of FIG. 1.

As shown in FIG. 1, according to an exemplary CCV apparatus 100 of the present invention, a middle case 123 is coupled to a lower case 113, and an upper case 120 is positioned on the middle case 123.

The middle case 123 includes a body 132 mounted in the lower case 113, an upper plate 129 coupled to an upper end of the body 132, and a cup 127 formed on an upper surface of the upper plate 129.

The lower case 113 has a cylindrical shape, a lower end portion of the lower case 113 is connected to a withdrawal pipe 115, and the withdrawal pipe 115 is connected to an oil pan (not shown).

A blow-by gas passageway 125 penetrates substantially a middle portion of the upper plate 129 of the middle case 123 to form a lower portion which is positioned under the upper plate 129 and a upper portion which is positioned in the cup 127.

A filter 130 is mounted at the lower portion of the blow-by gas passageway 125. The filter 130 filters engine oil contained in the blow-by gas flown from the cup 127 and the filtered engine oil is withdrawn to the oil pan (not shown) disposed at a lower portion of an engine through the withdrawal pipe 115.

The upper plate 129 of the middle case 123 blocks flow of blow-by gas between the cup 127 and the body 132 except flow of blow-by gas through the blow-by gas passageway 125. In addition, at least a gas hole 170 is formed at a portion of the upper plate 129 around the exterior circumference of the cup 127, and thereby the gas hole 170 exhausts to the exterior of the cup 127 the blow-by gas that is filtered by the filter 130 and stored in the body 132.

A first elastic member 135 is mounted at an exterior circumference of the upper portion of blow-by gas passageway 125.

The cup 127 is formed on the upper surface of the upper plate 129, and an inlet pipe 105 for receiving blow-by gas from a crankcase and an outlet pipe 110 for supplying the filtered or the filtered and detoured blow-by gas to an intake manifold are formed at a side surface of the cup 127. The inlet pipe 105 and the outlet pipe 110 may be coupled to the upper end of the lower case 113 in an embodiment of the present invention.

The inlet pipe 105 is fluidly-communicated with the inside of the cup 127 such that blow-by gas in the crankcase flows into the inside of the cup 127. The outlet pipe 110 is fluidly-communicated with the inside of the cup 127 via the gas hole 170 positioned outside the cup 127. Therefore, at not high pressure, blow-by gas in the cup 127 does not directly flow to the outlet pipe 110 but instead, blow-by gas in the cup 127 flows to the outlet pipe 110 after being filtered.

In addition, the cup 127 is provided with a diaphragm 140 for covering an opening positioned at an upper end of the cup 127 and the distal end of the first elastic member 135 is coupled to a portion of the diaphragm 140 to give a restoring force to the diaphragm 140 downwardly and guide the diaphragm 140 to return to home position. Further the diaphragm 140 is disposed apart from an upper portion of the blow-by gas passageway 125 by the first elastic member 135 to permit the blow-by gas of the inlet pipe 105 to flow into the blow-by gas passageway 125 normally. In addition, the diaphragm 140, together with an aid of elastic force of the first elastic member 135, controls pressure in the crankcase and makes the pressure in the cup 127 stable.

The upper case 120 is configured to enclose the upper end of the cup 127. The upper case 120 has a one-side opened structure such that the diaphragm 140 moves upwardly or downwardly therein.

In addition, the inlet pipe 105 can be selectively connected to the outlet pipe 110 by a by-pass passageway 160 mounted on an upper portion of the upper case 120.

According to an exemplary embodiment of the present invention, the by-pass passageway 160 mounted on the upper portion of the upper case 120 is exemplified, but the by-pass passageway 160 may be mounted at any convenient location exterior of the cases 113, 120, and 123. Since the by-pass passageway 160 is mounted at the exterior of the cases 113, 120, and 123, the cross-sectional area of the by-pass passageway 160 may be enlarged in comparison with conventional art and thereby bypass amount of blow-by gas is increased.

Hereinafter, the by-pass passageway 160 will be described in detail.

As shown in FIG. 2, the by-pass passageway 160 includes a by-pass inlet pipe 162, a connecting pipe 164, a by-pass outlet pipe 166, a by-pass valve 145, and a guide passageway 168.

The by-pass inlet pipe 162 is bifurcated from and always connected to the inlet pipe 105. The by-pass inlet pipe 162 is connected to a side surface of the connecting pipe 164.

In an embodiment of the present invention, the connecting pipe 164 is formed perpendicularly to the upper surface of the upper portion of the upper case 120. A lower end of the connecting pipe 164 is blocked by the upper portion of the upper case 120, and an upper end of the connecting pipe 164 is opened.

The by-pass outlet pipe 166 is configured to be selectively connected to the connecting pipe 164 by operation of the by-pass valve 145. In addition, the by-pass outlet pipe 166 is always connected to the outlet pipe 110.

The guide passageway 168 is formed above the connecting pipe 164 and further the guide passageway 168, and by-pass valve 145 may be formed coaxially with the connecting pipe 164. The guide passageway 168 guides motion of the by-pass valve 145.

In addition, a second elastic member 150 that applies elastic force downwardly to the by-pass valve 145 is mounted in the guide passageway 168. Therefore, when pressure of blow-by gas in the inlet pipe 105 is not high, the by-pass valve 145 blocks an upper end of the connecting pipe 164 by the elastic force of the second elastic member 150 and thus prevents blow-by gas from being detoured from the inlet pipe 105.

On the contrary, when pressure of blow-by gas in the inlet pipe 105 is high enough to overcome the elastic force of the second elastic member 150, the by-pass valve 145 moves upwardly. Accordingly the by-pass inlet pipe 162 is connected to the by-pass outlet pipe 166 via the connecting pipe 164 and blow-by gas is detoured from the inlet pipe 105.

In an exemplary embodiment of the present invention, an indicator 155 is mounted on an upper end of the by-pass valve 145 and displays degradation of the filter 130. In addition, the by-pass valve 145 may be made of a strong synthetic resin.

However it is understood that the pressure of the present invention to overcome the second elastic member may be determined according to usage and performance of the apparatus by a person or ordinary skill in the art.

Hereinafter, referring to FIG. 1 to FIG. 4, operation of the CCV apparatus according to an exemplary embodiment of the present invention will be described in detail.

As shown in FIG. 1 and FIG. 2, when pressure in the crankcase is not high, the force that the blow-by gas applies to the by-pass valve 145 is smaller than the elastic force of the second elastic member 150, and thus the by-pass valve 145 disconnects the connecting pipe 164 from the by-pass outlet pipe 166. Therefore, the blow-by gas is not detoured through the by-pass passageway 160. In this case, blow-by gas in the crankcase flows into the cup 127 through the inlet pipe 105 and then flows to the filter 130 through the blow-by gas passageway 125. As a result, the filter 130 filters engine oil contained in the blow-by gas and sends the filtered engine oil to the withdrawal pipe 115. The filtered blow-by gas flows to the outlet pipe 110 through the gas hole 170 and is then supplied to the intake manifold.

Figure 3:
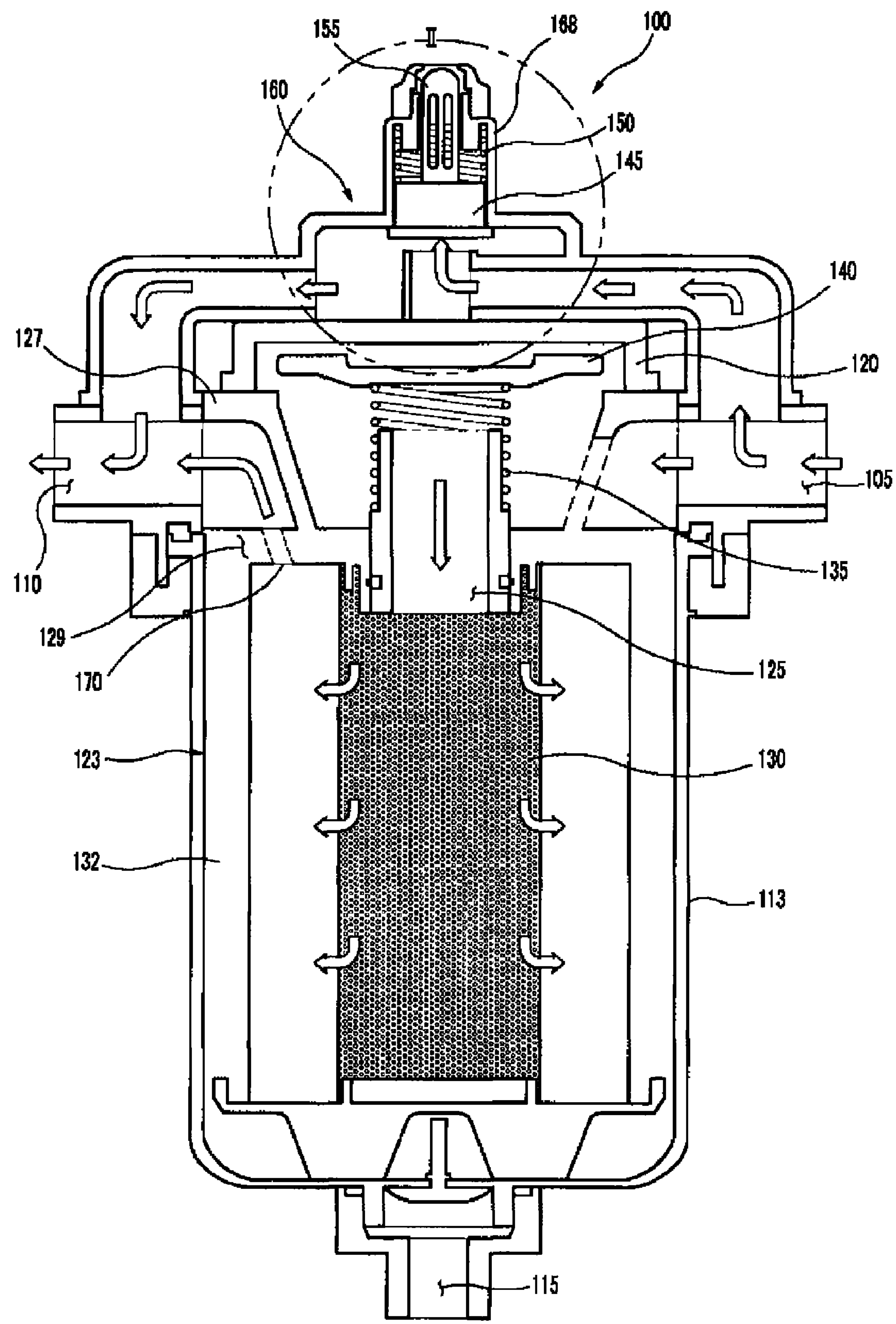
FIG. 3 is a cross-sectional view of a CCV apparatus in a state of detouring blow-by gas according to an exemplary embodiment of the present invention.
Figure 4:
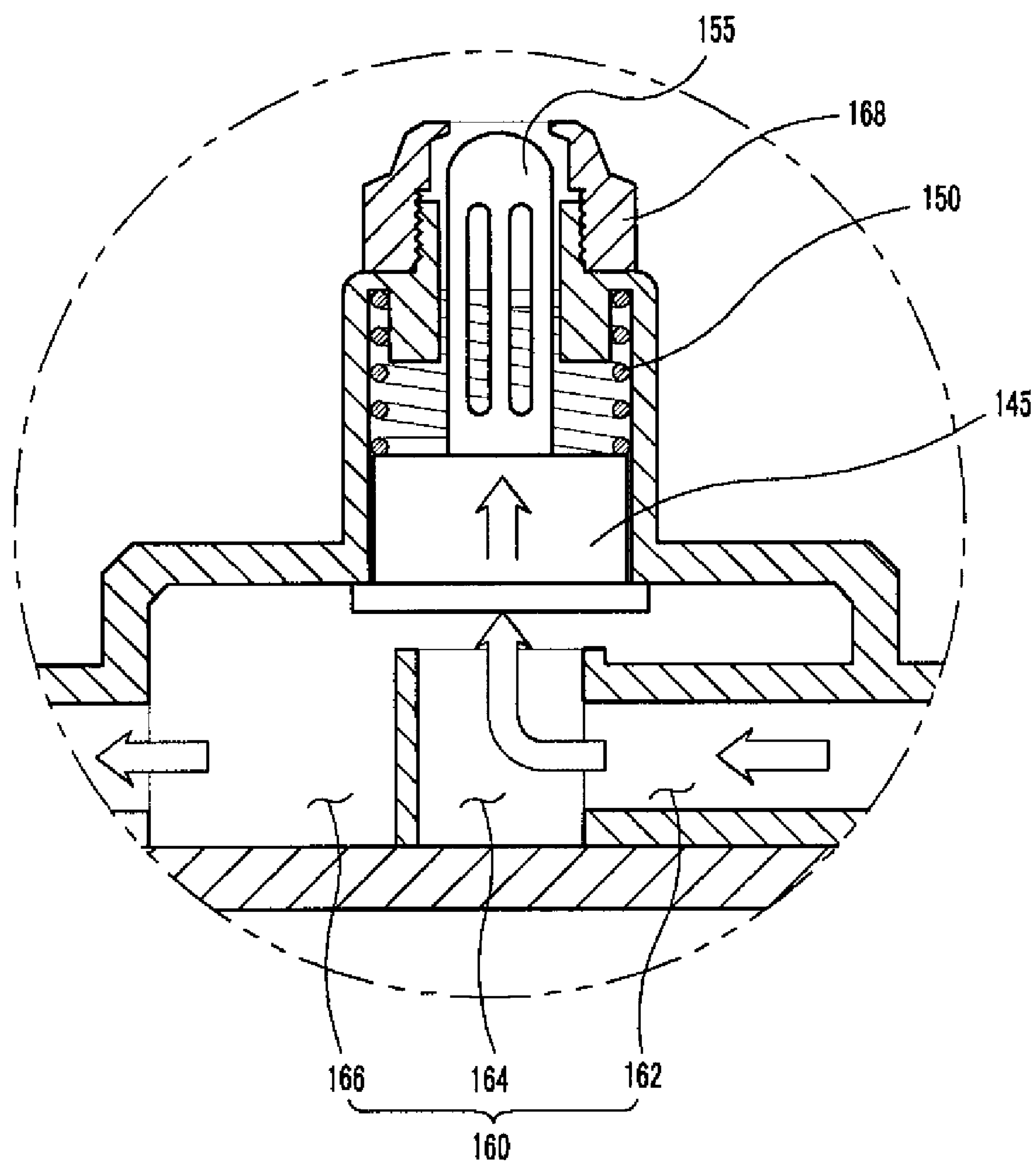
FIG. 4 is an enlarged view of an "II" portion of FIG. 3.

As shown in FIG. 3 and FIG. 4, when pressure of the by-pass gas in the crankcase is high such that the force that blow-by gas applies to the by-pass valve 145 is larger than the elastic force of the second elastic member 150, the by-pass valve 145 moves upwardly. Therefore, the connecting pipe 164 is connected to the by-pass outlet pipe 166 and the blow-by gas flows to the outlet pipe 110 after passing sequentially through the by-pass inlet pipe 162, the connecting pipe 164, and the by-pass outlet pipe 164. Furthermore, since the high pressure of the by-pass gas inlet pipe 105 is also applied to the diaphragm 140, the diaphragm 140 moves further upwardly in overcoming a restoring force of the first elastic member 135 as shown in FIG. 3 to flow the high-pressured by-pass gas through the blow-by gas passageway 125. After that, the blow-by gas flown from the by-pass passage 160 and the blow-by gas passageway 125 may be joined at the outlet pipe 110 and supplied to the intake manifold in an exemplary embodiment of the present invention.

Figure 5:
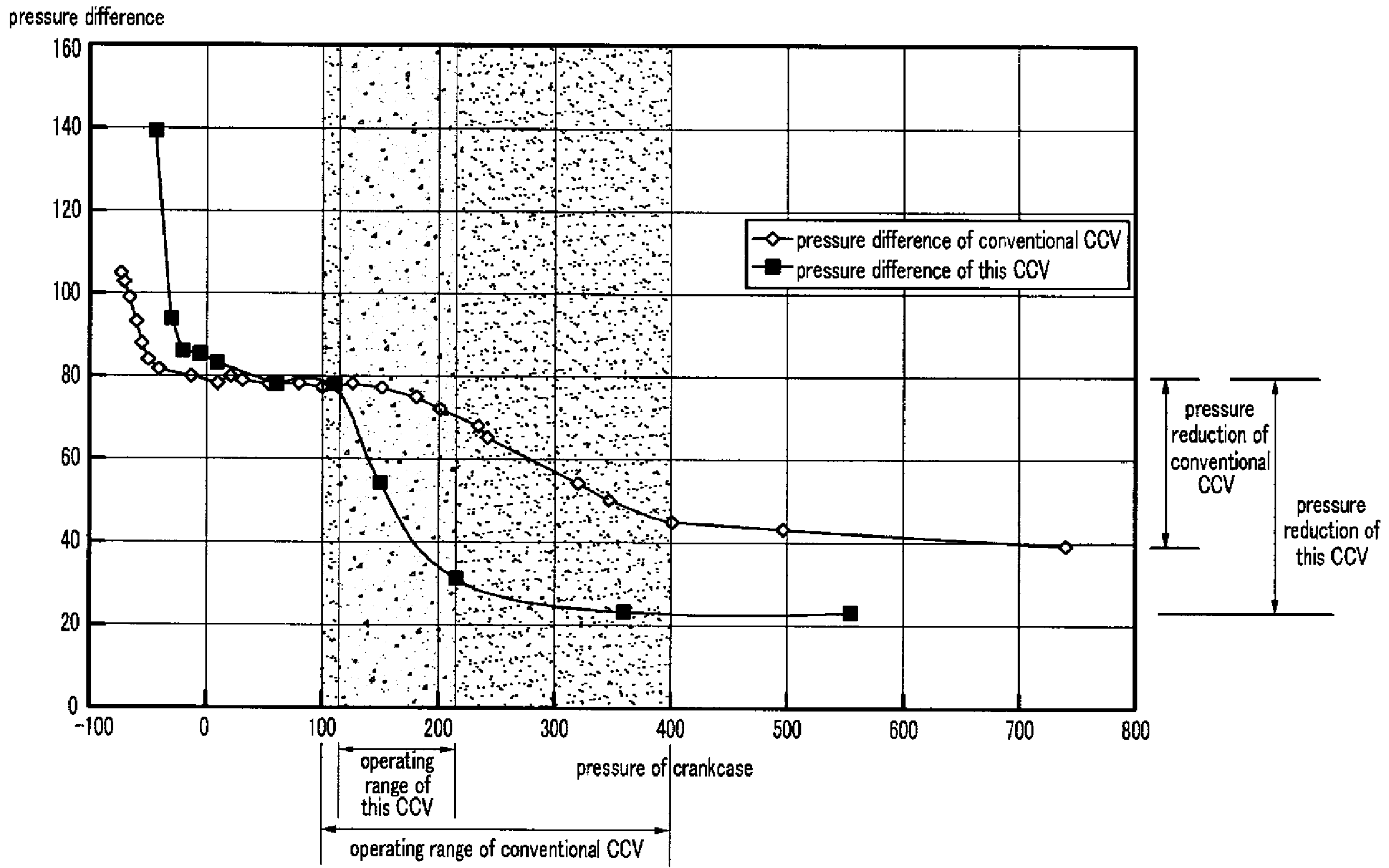
FIG. 5 is a graph comparing performance of this CCV apparatus with that of a conventional CCV apparatus.
Figure 6:
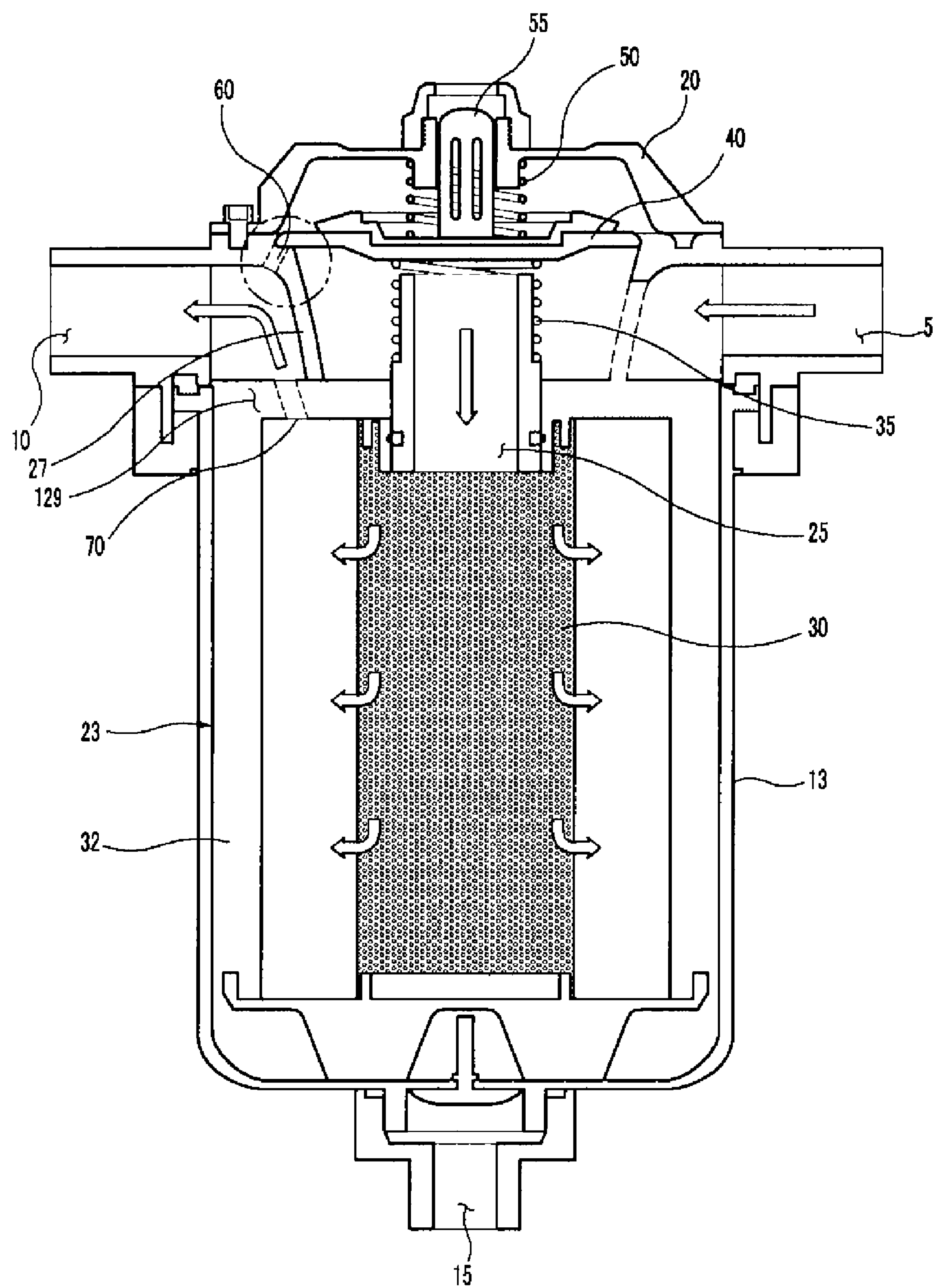
FIG. 6 is a cross-sectional view of a conventional CCV apparatus.
Figure 7:
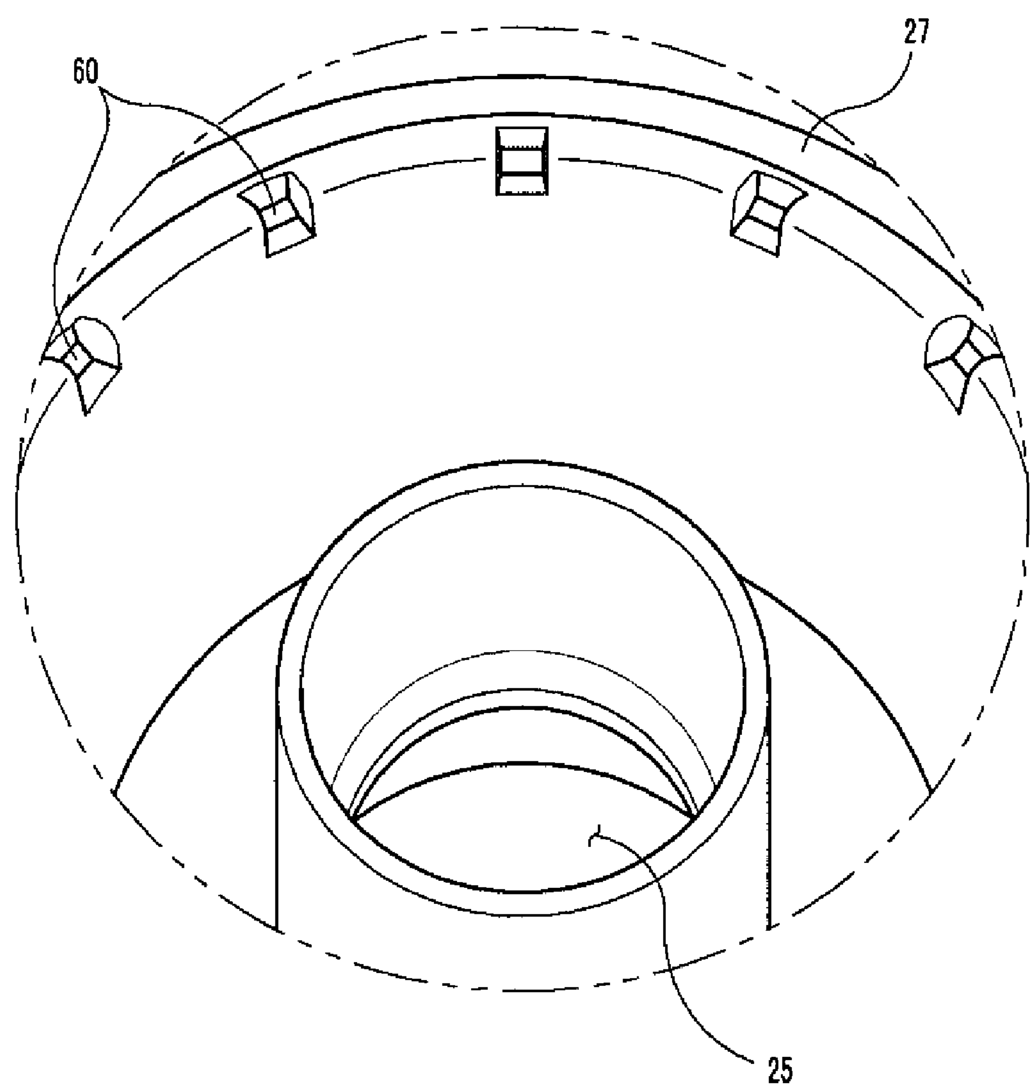
FIG. 7 is a perspective view of a cup including by-pass holes according to a conventional CCV apparatus.
Figure 8:
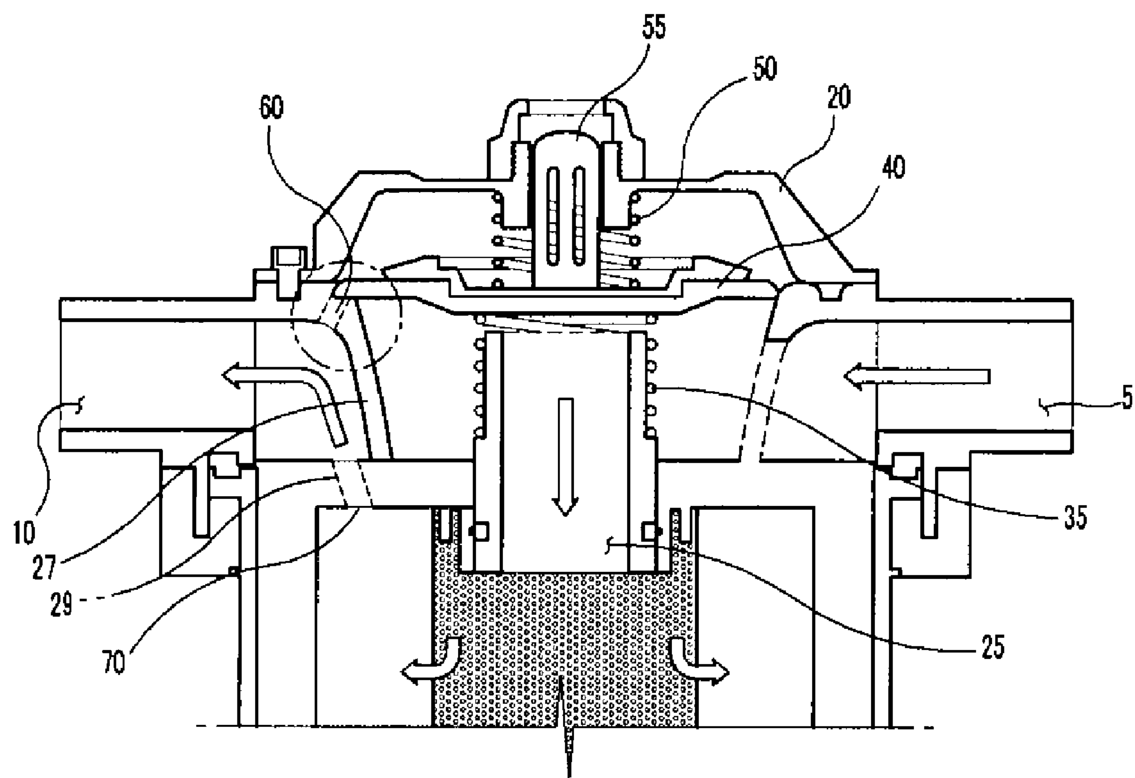
FIG. 8 is a partial cross-sectional view of a conventional CCV apparatus in a state of not detouring blow-by gas.
Figure 9:
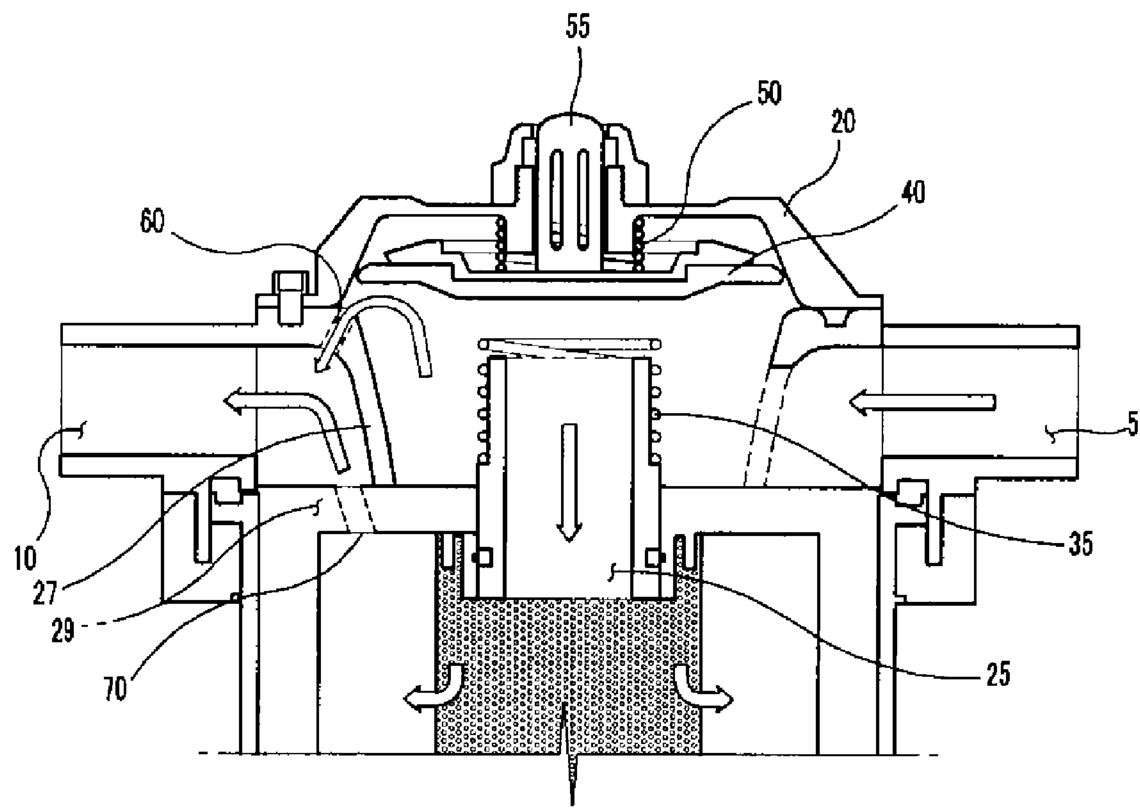
FIG. 9 is a partial cross-sectional view of a conventional CCV apparatus in a state of detouring blow-by gas.

FIG. 5 is a graph comparing performance of this CCV apparatus with that of a conventional CCV apparatus.

As shown in FIG. 5, the operating range of this CCV apparatus is smaller than that of a conventional CCV apparatus. If the operating range of a CCV apparatus is large, a response time when the engine endures excessively high pressure of the crankcase becomes long. Thus, if the operating range of a CCV apparatus is large, durability of the engine may be deteriorated. Therefore, durability of the engine may increase according to the CCV apparatus of the present invention.

In addition, crankcase pressure reduction of this CCV apparatus is larger than that of a conventional CCV apparatus. If pressure reduction in the crankcase is large, a time when the engine endures excessively high pressure of the crankcase becomes short. Therefore, durability of the engine may increase according to the CCV apparatus of the present invention.

As described above, since a by-pass passageway where blow-by gas is detoured is mounted at the exterior of cases, a cross-sectional area of the by-pass passage may be enlarged and detoured blow-by gas may be increased according to an exemplary embodiment of the present invention. Therefore, pressure reduction in a crankcase may be increased.

In addition, since the first elastic member controls operation of a diaphragm and the second elastic member controls operation of a by-pass valve separately, tuning of the first and second elastic members may be facilitated.

Further, since the diaphragm of a rubber material is used usually for maintaining pressure stable in the cup and a high strength by-pass valve controls bypass of blow-by gas, durability of the diaphragm may be enhanced.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A closed crankcase ventilation apparatus, comprising:

a lower case connected to a withdrawal pipe;

a middle case comprising a body mounted in the lower case, an upper plate coupled with an upper end of the body, and a cup formed on an upper surface of the upper plate, the upper plate being provided with a blow-by gas passageway in the cup for flowing blow-by gas into the body therethrough and at least a gas hole formed in the upper plate outside the cup for flowing the blow-by gas in the body to the exterior of the cup;

a filter mounted at a lower portion of the blow-by gas passageway and filtering engine oil contained in the blow-by gas wherein the filtered engine oil is withdrawn through the withdrawal pipe;

an inlet pipe connected to a portion of an exterior circumference of the cup in order to flow blow-by gas of the inlet pipe into the cup;

an outlet pipe fluidly communicating with the gas hole of the middle case in order to exhaust the filtered blow-by gas in the body;

an upper case having a one-side opened structure and configured to enclose an opening at an upper end of the cup; and a by-pass passageway selectively detouring the blow-by gas of the inlet pipe according to a pressure of the blow-by gas in the inlet pipe wherein the by-pass passageway is mounted at the exterior of the lower, middle and upper cases.

2. The closed crankcase ventilation apparatus of claim 1, wherein the blow-by gas in the inlet pipe flows through the blow-by gas passageway in low pressure and the blow-by gas in the inlet pipe flows through the blow-by gas passageway and the by-pass passageway in high pressure.

3. The closed crankcase ventilation apparatus of claim 1, further comprising a diaphragm for covering the opening of the cup in the upper case, wherein the diaphragm is disposed apart from an upper portion of the blow-by gas passageway by a predetermined distance.

4. The closed crankcase ventilation apparatus of claim 3, further comprising a first elastic member mounted at an exterior circumference of the upper portion of the blow-by gas passageway wherein the first elastic member has the predetermined distance and a distal end of the first elastic member is coupled to the diaphragm, elastically supporting the diaphragm.

5. The closed crankcase ventilation apparatus of claim 1, wherein the by-pass passageway comprises:

a by-pass inlet pipe bifurcated from the inlet pipe;

a connecting pipe connected to the by-pass inlet pipe and formed in a longitudinal axis of the upper case, a lower end thereof being blocked by the upper case and an upper end thereof being opened;

a by-pass outlet pipe; and a by-pass valve selectively connecting the connecting pipe with the by-pass outlet pipe, wherein the by-pass valve is disposed in a guide passageway coaxially formed with the connecting pipe thereabove and the guide passageway guides a motion of the by-pass valve.

6. The closed crankcase ventilation apparatus of claim 1, wherein the by-pass outlet pipe is always connected to the outlet pipe.

7. The closed crankcase ventilation apparatus of claim 5, further comprising a second elastic member mounted in the guide passageway and positioned above the by-pass valve, and applying elastic force to the by-pass valve.

8. The closed crankcase ventilation apparatus of claim 5, further comprising an indicator mounted on an upper end of the by-pass valve and displaying degradation of the filter through an opening of the guide passageway.

* * * * *